(12) United States Patent
Kitayama (10) Patent No.: US 11,911,898 B2
(45) Date of Patent: Feb. 27, 2024

(54) ROBOT

(71) Applicant: NACHI-FUJIKOSHI CORP., Tokyo (JP)

(72) Inventor: Yusuke Kitayama, Toyama (JP)

(73) Assignee: NACHI-FUJIKOSHI CORP., Tokyo (JP)

( * ) Notice: Subject to any disclaimer, the term of this patent is extended or adjusted under 35 U.S.C. 154(b) by 0 days.

(21) Appl. No.: 18/295,421

(22) Filed: Apr. 4, 2023

(65) Prior Publication Data

US 2023/0321816 A1 Oct. 12, 2023

(30) Foreign Application Priority Data

Apr. 6, 2022 (JP) ................. 2022-063572

(51) Int. Cl.
*B25J 9/10* (2006.01)
(52) U.S. Cl.
CPC ...................... *B25J 9/106* (2013.01)
(58) Field of Classification Search
CPC ........... B25J 9/046; B25J 9/106; B25J 9/1065
See application file for complete search history.

(56) References Cited

FOREIGN PATENT DOCUMENTS

| JP | H1015861 A | 1/1998 |
|---|---|---|
| JP | 3813542 B2 | 8/2006 |
| JP | 200744840 A | 2/2007 |
| JP | 2007229906 A | 9/2007 |

*Primary Examiner* — Bobby Rushing, Jr.
(74) *Attorney, Agent, or Firm* — Maier & Maier, PLLC

(57) ABSTRACT

A robot includes a first joint member, a second joint member connecting a second arm member and a third arm member, a third joint member connecting the third arm member and a flange, a first link having one end connected to the second joint member and another end connected to the third joint member, a second link having one end connected to the second joint member, a counter weight connected to another end of the second link and the first joint member, and including a motor rotating the third arm member, on a side opposite to the first joint member with the other end of the second link as a base point, and a transmission member transmitting rotating force generated by the motor to the third arm member through the first joint member, the second arm member, and the second joint member.

6 Claims, 8 Drawing Sheets

ROBOT

CROSS-REFERENCE TO RELATED APPLICATION

This application is based upon and claims the benefit of priority from Japanese Patent Application No. 2022-063572 filed on Apr. 6, 2022, the contents all of which are incorporated herein by reference.

FIELD

The present invention relates to a robot, and in particular to a robot including an articulated movable arm and a parallel link mechanism.

BACKGROUND

A robot has been known that includes an articulated movable arm provided with a parallel link mechanism to enhance the rigidity of the articulated movable arm. The parallel link mechanism includes a plurality of links provided substantially in parallel with respective arm members of the articulated movable arm, and a joint member connecting the links and the arm members, and supports the arm members by the respective links.

With regard to this, Japanese Patent No. 3813542 discloses a configuration in which, in a robot including a first arm, a second arm rotatably supported by the first arm, a third arm rotatably supported by the second arm, a wrist member rotatably supported by the third arm, and a parallelogram link mechanism, a decelerator driving the wrist member is provided at a journaling member for the first arm and the second arm, and a balance mechanism performing pressing action in a direction opposite to motion of the wrist member is provided at an extension of a second link of the parallelogram link mechanism.

SUMMARY

However, in the technique disclosed in Japanese Patent No. 3813542, a motor rotating a fourth arm relative to the third arm is disposed at a connection member between the third arm and the fourth arm. Therefore, the weight of the motor is applied to a motor rotating the third arm relative to the second arm. As a result, in the technique disclosed in Japanese Patent No. 3813542, the volume of a vicinity of the fourth arm may be increased.

The present invention has been made in consideration of such problems, and an object of the present invention is to provide a robot that can reduce the volume of a vicinity of an arm at a front end of an articulated movable arm.

To solve the above-described issues, a robot according to the present invention includes: a first arm member; a first joint member connected to one end of the first arm member; a second arm member having one end connected to the first joint member, so as to rotate relative to the first arm member through the first joint member; a second joint member connected to another end of the second arm member; a third arm member having one end connected to the second joint member, so as to rotate relative to the second arm member through the second joint member; a third joint member connected to another end of the third arm member; a flange connected to the third joint member, and configuring to perform a predetermined work on a workpiece; a first link having one end connected to the second joint member, and another end connected to the third joint member; a second link having one end connected to the second joint member; a counter weight connected to another end of the second link and the first joint member, and including a motor on a side opposite to the first joint member with the other end of the second link in between, the motor rotating the third arm member relative to the second arm member; and a transmission member configuring to transmit rotating force generated by the motor to the third arm member through the first joint member, the second arm member, and the second joint member.

Further, the first link is provided to be substantially parallel to the third arm member on a first direction side in a rotating direction of the third arm member relative to the second arm member, and the second link is provided parallel to the second arm member on the first direction side.

Further, the transmission member includes a first transmission mechanism provided inside the counter weight, and a second transmission mechanism provided inside the second arm member. The first transmission mechanism transmits rotating force of the motor to the second transmission mechanism through the first joint member. The second transmission mechanism transmits the rotating force transmitted from the first transmission mechanism to the third arm member through the second joint member.

Further, the first transmission mechanism includes a first pulley configuring to rotate following the rotating force generated by the motor, a first belt configuring to transmit the rotating force of the first pulley, and a second pulley configuring to transmit the rotating force transmitted from the first belt to the second transmission mechanism. The second transmission mechanism includes a third pulley configuring to rotate following the rotating force transmitted from the second pulley, a second belt configuring to transmit the rotating force of the third pulley, and a fourth pulley configuring to transmit the rotating force transmitted from the second belt to the third arm member.

According to the present invention, the robot that can reduce the volume of the vicinity of the arm at the front end of the articulated movable arm.

The above and other objects, features, and advantages of the present invention will become more apparent from the following description when taken in conjunction with the accompanying drawings in which a preferred embodiment of the present invention is shown by way of illustrative example.

DETAILED DESCRIPTION

An embodiment (hereinafter, referred to as "the present embodiment") of the present invention is described below with reference to the accompanying drawings. To facilitate understanding of the description, the same components and steps in the drawings are denoted by the same reference numerals as much as possible, and repetitive description is omitted.

<Configuration>

Figure 1:
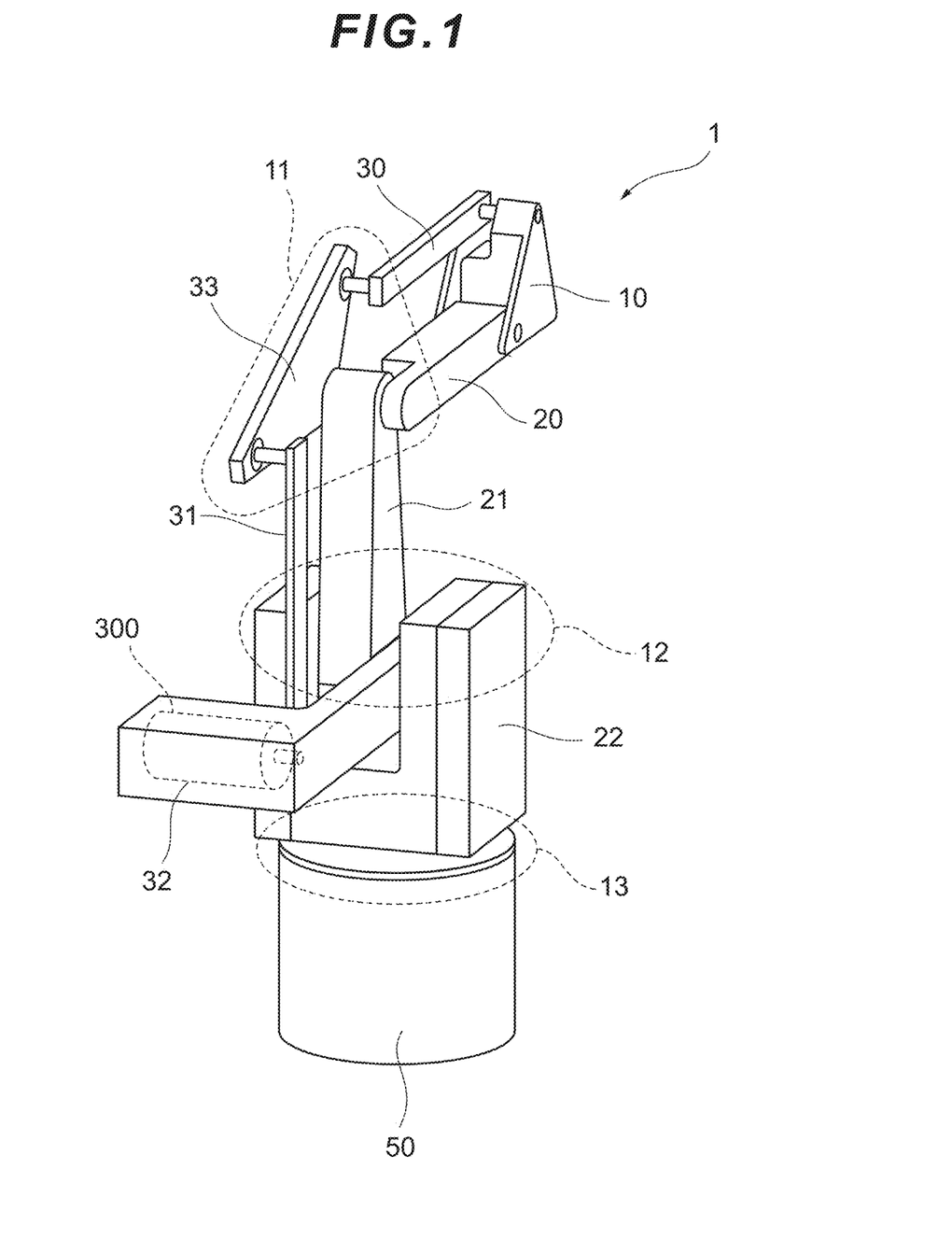
FIG. 1 is a perspective view of a robot according to an embodiment.
Figure 2A:
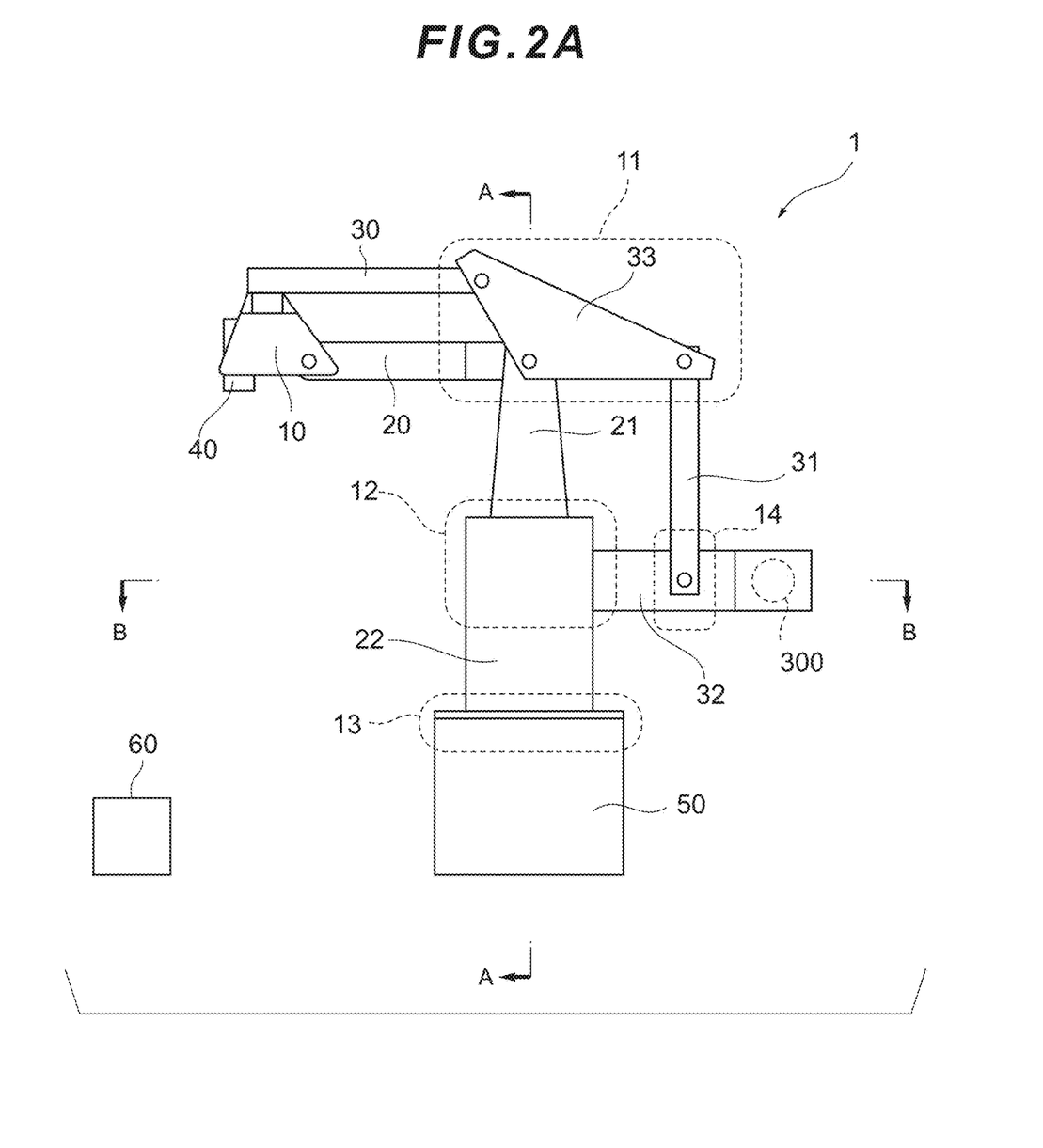
FIG. 2A is a side view of the robot illustrated in FIG. 1.
Figure 2B:
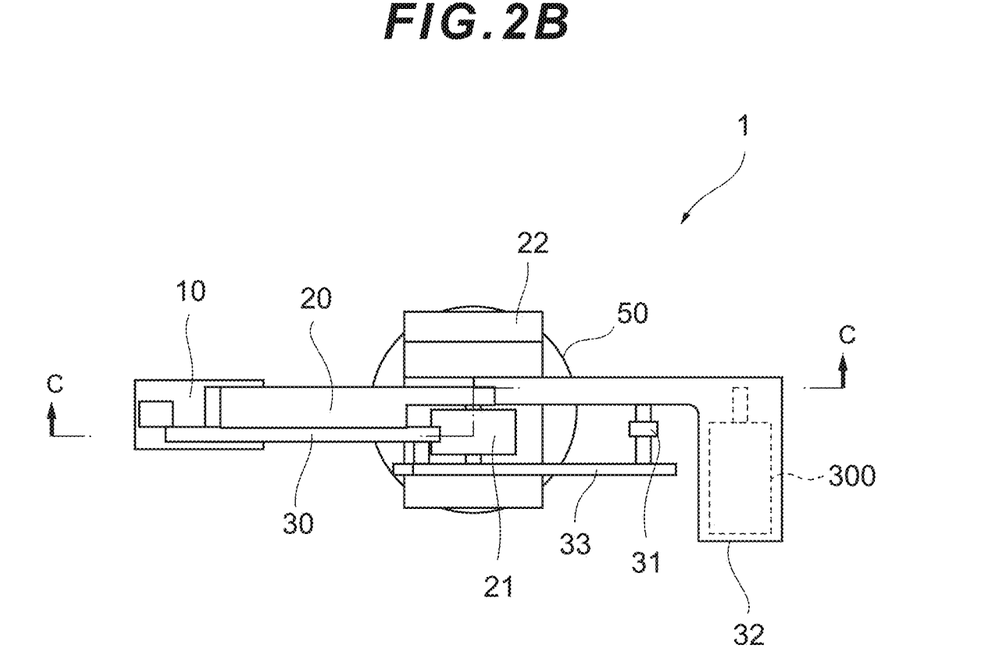
FIG. 2B is a top view of the robot illustrated in FIG. 1.

FIG. 1 is a perspective view of a robot 1 according to the present embodiment. FIG. 2A and FIG. 2B are respectively a side view and a top view of the robot 1.

As illustrated in FIG. 1, FIG. 2A, and FIG. 2B, the robot 1 includes an articulated movable arm, for example, joint members 10 to 14, arm members 20 to 22, links 30, 31, and 33, a counter weight 32, a flange 40, and a base member 50.

The base member 50 is a base supporting the robot 1, is installed so as to come into contact with an unillustrated installation surface of the robot 1, and is fixed to the installation surface. The base member 50 is connected to the arm member 22 through the joint member 13.

The arm member 22 (first arm member) is installed on an upper surface of the base member 50. A bottom part (one end) of the arm member 22 is connected to the base member 50 through the joint member 13 such that the arm member 22 can rotate relative to the base member 50 with an axis that extends in an extending direction of the base member 50 and is perpendicular to the installation surface of the robot 1, as a rotating axis. Further, an upper part (another end) of the arm member 22 is connected to the arm member 21 and the counter weight 32 through the joint member 12.

One end of an arm member 21 (second arm member) is connected to the arm member 22 through the joint member 12 such that the arm member 21 can rotate relative to the arm member 22 with an axis parallel to the installation surface of the robot 1 as a rotating axis. Further, another end of the arm member 21 is connected to the arm member 20 through the joint member 11.

One end of the arm member 20 (third arm member) is connected to the arm member 21 through the joint member 11 such that the arm member 20 can rotate relative to the arm member 21 with an axis perpendicular to an extending direction of the arm member 21 as a rotating axis. Further, another end of the arm member 20 is connected to the joint member 10.

The flange 40 is a member performing a predetermined work on a workpiece 60. The predetermined work is holding, release of holding, movement, rotation, and the like of the workpiece 60. The flange 40 includes, for example, a mechanism that can rotate with an axis parallel to an extending direction of the flange 40 as a rotating axis, and a base part of the flange 40 is connected to the joint member 10.

The base part of the flange 40 is connected to a front end of the joint member 10 (third joint member). Further, the joint member 10 is connected to the arm member 20 so as to rotate relative to the arm member 20 with an axis perpendicular to the extending direction of the arm member 21 as a rotating axis. Further, one end of the link 30 is connected to a position of the joint member 10 different from a position connected to the arm member 20 such that the joint member 10 can rotate relative to the link 30 with an axis perpendicular to an extending direction of the link 30 as a rotating axis.

The joint member 11 (second joint member) connects the arm member 20 and the arm member 21 such that the arm member 20 can rotate relative to the arm member 21 with the axis perpendicular to the extending direction of the arm member 21 as a rotating axis. Further, the joint member 11 connects another end of the link 30 and the link 33 such that the link 30 can rotate relative to the link 33 with the axis perpendicular to the extending direction of the link 30 as a rotating axis. Further, the joint member 11 connects one end of the link 31 to a position of the link 33 different from a position connected to the link 30 such that the link 31 can rotate relative to the link 33 with an axis perpendicular to an extending direction of the link 31 as a rotating axis.

The joint member 12 (first joint member) connects the arm members 21 and 22 such that the arm member 21 can rotate relative to the arm member 22 with the axis perpendicular to the extending direction of the arm member 21 as a rotating axis.

The joint member 13 connects the base member 50 and the arm member 22 such that the arm member 22 can rotate relative to the base member 50 with the axis that extends in the extending direction of the base member 50 and is perpendicular to the installation surface of the robot 1, as a rotating axis.

The joint member 14 connects the counter weight 32 and the link 31 such that the link 31 can rotate relative to the counter weight 32 with the axis perpendicular to the extending direction of the link 31 as a rotating axis.

To support rigidity of the arm member 20, the link (first link) is provided between the joint member 10 and the joint member 11 so as to be parallel to the arm member 20 on a direction R1 side (first direction, see FIG. 3A and FIG. 3B) in a rotating direction of the arm member 20 relative to the arm member 21. Further, the one end of the link 30 is connected to the joint member such that the link 30 can rotate relative to the joint member 10 with the axis perpendicular to the extending direction of the link 30 as a rotating axis. Further, the other end of the link 30 is connected to the link 33 such that the link 30 can rotate relative to the link 33 with the axis perpendicular to the extending direction of the link 30 as a rotating axis.

To support rigidity of the arm member 21, the link 31 (second link) is provided between the joint member 11 and the joint member 14 so as to be parallel to the arm member 21 on the direction R1 side (first direction, see FIG. 3A and FIG. 3B) in the rotating direction of the arm member 20 relative to the arm member 21. Further, the one end of the link 31 is connected to the link 33 such that the link 31 can rotate relative to the link 33 with the axis perpendicular to the extending direction of the link 31 as a rotating axis. Further, another end of the link 31 is connected to the counter weight 32 such that the link 31 can rotate relative to the counter weight 32 with the axis perpendicular to the extending direction of the link 31 as a rotating axis.

When the robot 1 operates to perform a predetermined work on the workpiece 60, the counter weight 32 functions as a weight to reduce a load in rotating operation of the joint member 11 by a deadweight. The counter weight 32 is connected to the arm members 21 and 22 through the joint member 12, and the other end of the link 31 is connected, through the joint member 14, to a position of the counter weight 32 different from a position connected to the arm members 21 and 22.

The link 33 is a member provided to connect the links 30 and 31, and to connect the arm members 20 and 21. The link 33 is connected to the other end of the link 30 such that the link 30 can rotate relative to the link 33 with the axis perpendicular to the extending direction of the link 30 as a rotating axis. Further, the link 33 is connected to the one end of the link 31 such that the link 31 can rotate relative to the link 33 with the axis perpendicular to the extending direction of the link 31 as a rotating axis. Furthermore, the link 33 is connected to the other end of the arm member 20 and one end of the arm member 21 such that the arm members 20 and 21 can rotate relative to the link 33 with an axis perpendicular to an extending direction of the arm member as a rotating axis. Note that, in the link 33, a position connected to the link 30, a position connected to the link 31, and a position connected to the arm members 20 and 21 are different from one another.

Figure 3A:
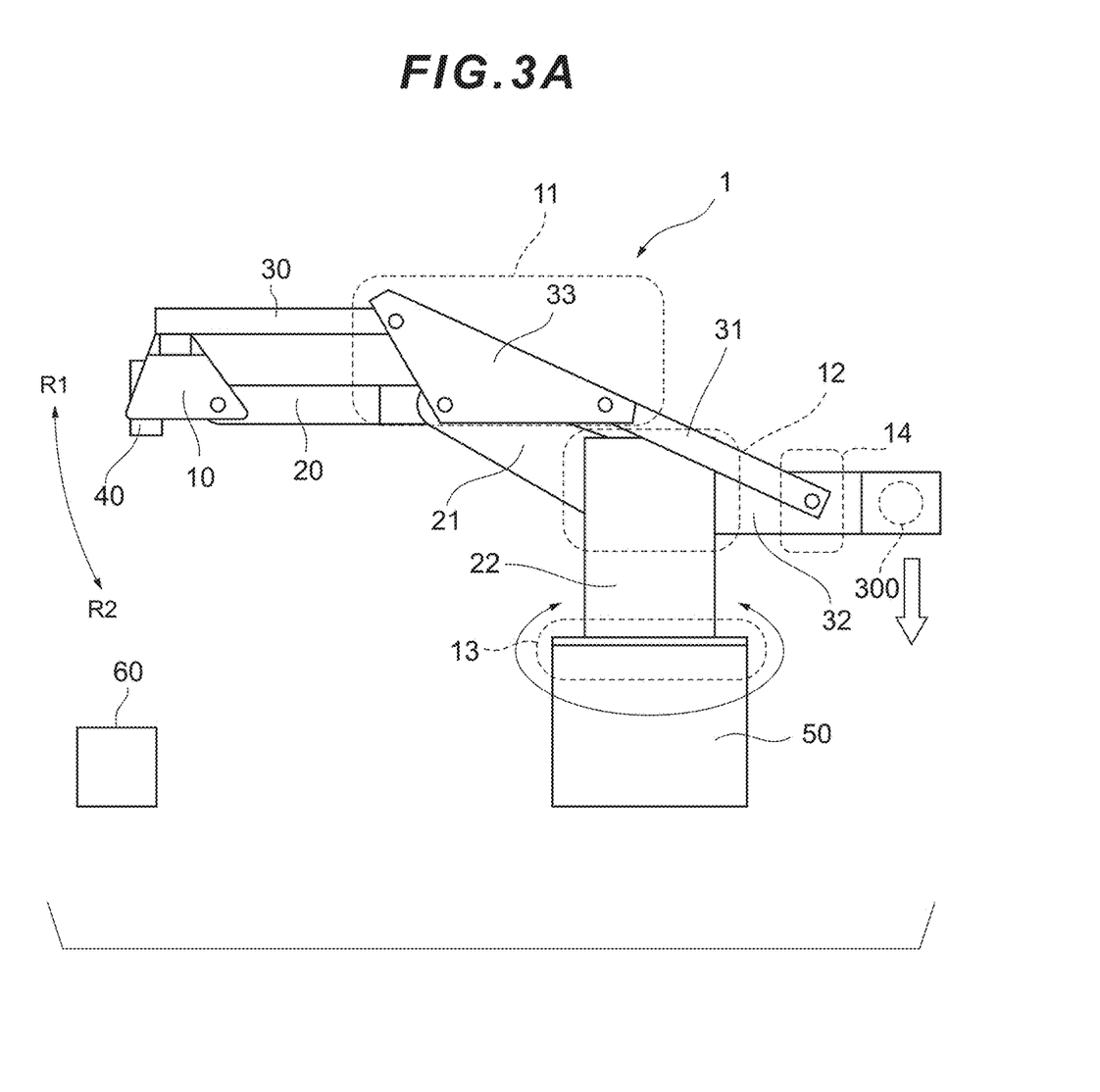
FIG. 3A is a side view of the robot at the time when an arm member in FIG. 2A rotates toward a workpiece.
Figure 3B:
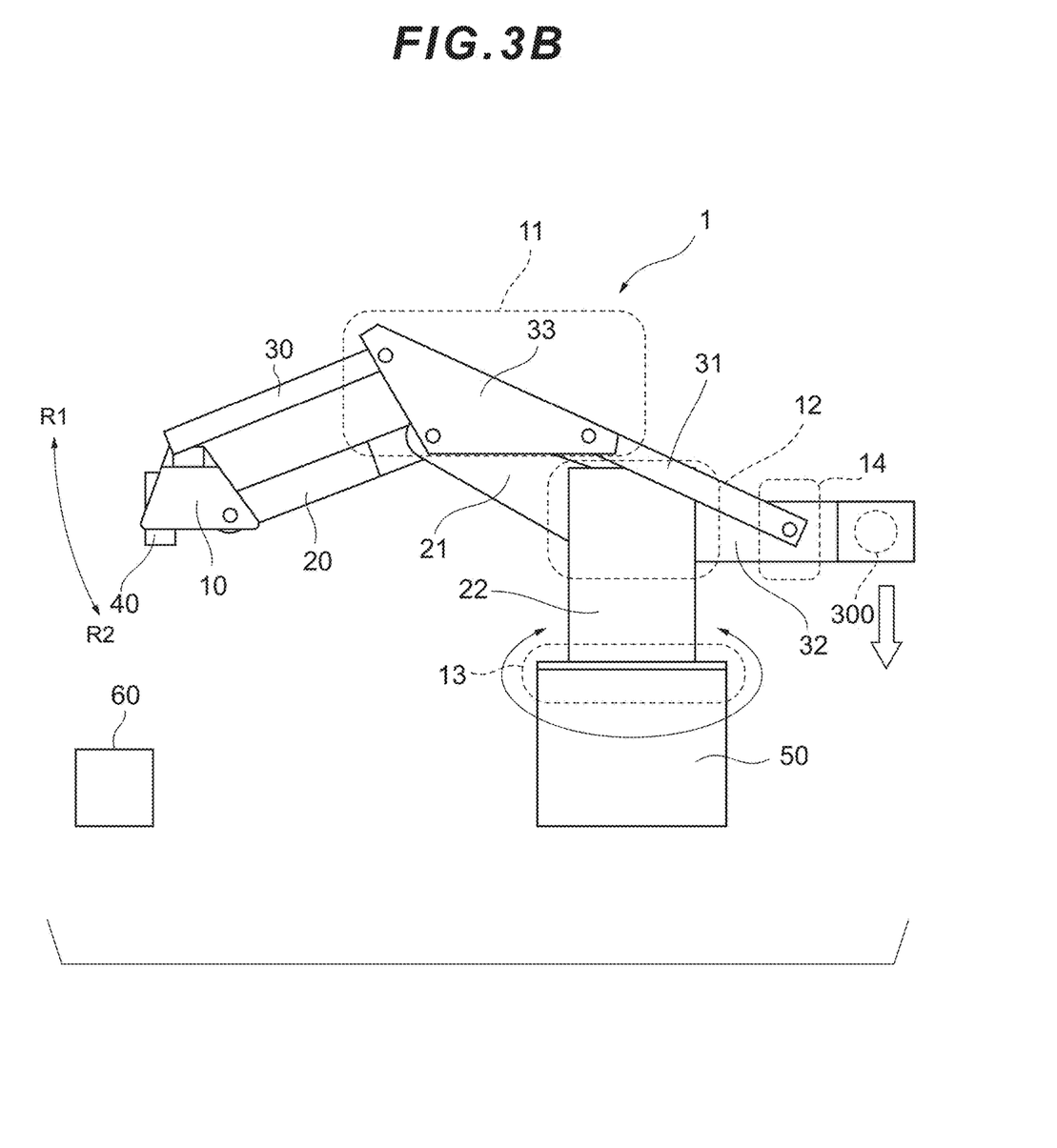
FIG. 3B is a side view of the robot at the time when the arm member in FIG. 3A rotates toward the workpiece.

FIG. 3A and FIG. 3B are side views of the robot 1 when the arm members 20 and 21 rotate toward the workpiece 60. In FIG. 3A and FIG. 3B, a direction approaching the workpiece 60 in the rotating direction is a direction R2. In addition, a direction away from the workpiece 60 in the rotating direction is a direction R1.

As illustrated in FIG. 3A and FIG. 3B, in a case where the arm members 20 and 21 of the robot 1 rotate with the axis parallel to the installation surface of the robot 1 as a rotating axis, the counter weight 32 assists rotating of the arm members 20 and 21 by the weight of the counter weight 32.

Figure 4A:
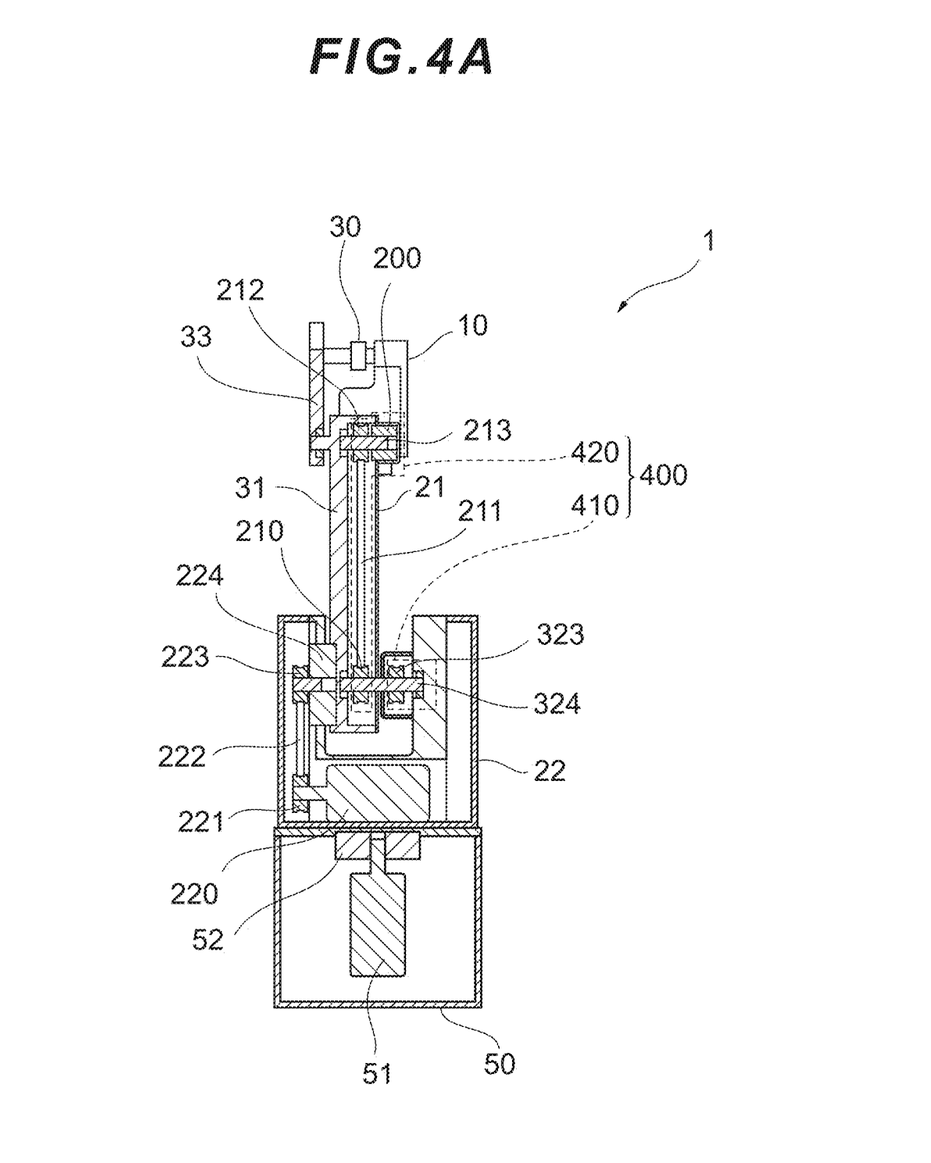
FIG. 4A is a cross-sectional view taken along line A-A of the robot illustrated in FIG. 2A.
Figure 4B:
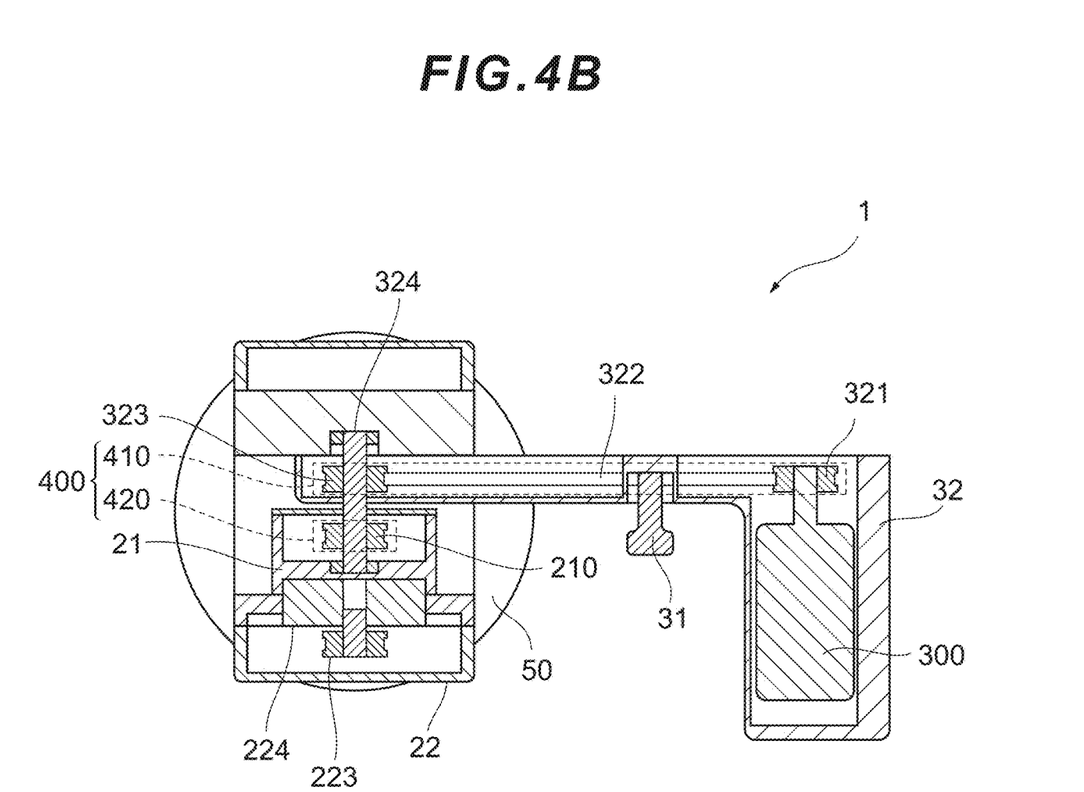
FIG. 4B is a cross-sectional view taken along line B-B of the robot illustrated in FIG. 2A.
Figure 4C:
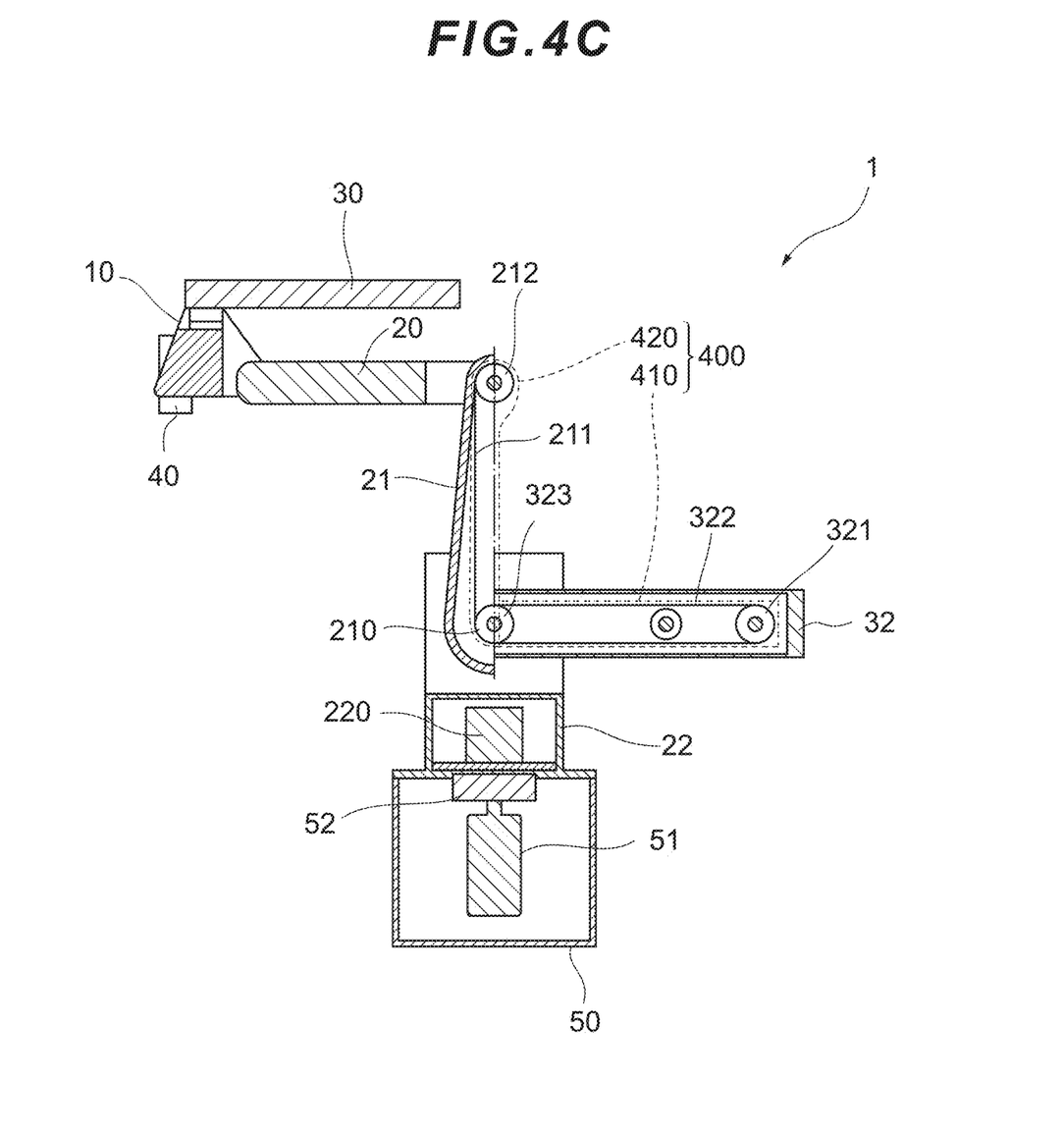
FIG. 4C is a cross-sectional view taken along line C-C of the robot illustrated in FIG. 2B.

FIG. 4A is a cross-sectional view of the robot 1 taken along line A-A in FIG. 2A. FIG. 4B is a cross-sectional view of the robot 1 taken along line B-B in FIG. 2A. FIG. 4C is a cross-sectional view of the robot 1 taken along line C-C in FIG. 2B.

As illustrated in FIG. 4A, FIG. 4B, and FIG. 4C, the robot 1 internally includes, for example, a transmission member 400. Further, the counter weight 32 internally includes, for example, a motor 300.

The motor 300 generates rotating force to rotate the arm member 20 relative to the arm member 21. The motor 300 is provided on a side opposite to the joint member 12 with the link 31 in between, inside the counter weight 32. The motor 300 generates the rotating force with an axis in a direction horizontal to the installation surface of the robot 1 as a rotating axis, and transmits the generated rotating force to a pulley 321 of a first transmission mechanism 410 of the transmission member 400.

The transmission member 400 is a member transmitting the rotating force generated by the motor 300, to the arm member 20 through the joint member 12, the arm member 21, and the joint member 11, and is provided inside the joint members 11 and 12, the arm members 20 and 21, and the counter weight 32. The transmission member 400 includes, for example, the first transmission mechanism 410 and a second transmission mechanism 420.

The first transmission mechanism 410 is a member transmitting the rotating force generated by the motor 300, to the second transmission mechanism 420 through the joint member 12, and is provided inside the counter weight 32. The first transmission mechanism 410 includes, for example, the pulley 321, a pulley 323, and a belt 322.

The pulley 321 (first pulley) is provided inside the counter weight 32, and transmits the rotating force generated by the motor 300, to the belt 322.

The belt 322 (first belt) is provided inside the counter weight 32, and transmits the rotating force transmitted from the pulley 321, to the pulley 323.

The pulley 323 (second pulley) is provided inside the counter weight 32, and transmits the rotating force transmitted from the belt 322, to a pulley 210 of the second transmission mechanism 420 through a shaft 324.

The second transmission mechanism 420 is a member transmitting the rotating force transmitted from the first transmission mechanism 410, to the arm member 20 through the joint member 11, and is provided inside the arm member 21. The second transmission mechanism 420 includes, for example, a decelerator 200, the pulley 210, a pulley 212, a belt 211, and a shaft 213.

The pulley 210 (third pulley) is provided inside the arm member 21, and transmits the rotating force transmitted from the pulley 323 of the first transmission mechanism 410 through the shaft 324, to the belt 211.

The belt 211 (second belt) is provided inside the arm member 21, and transmits the rotating force transmitted from the pulley 210, to the pulley 212.

The pulley 212 (fourth pulley) is provided inside the arm member 21, and transmits the rotating force transmitted from the belt 211, to the decelerator 200 through the shaft 213.

The decelerator 200 is provided inside the arm member 21, converts a rotating speed of the rotating force transmitted from the pulley 212 through the shaft 213, at a predetermined ratio, and transmits the rotating force of the converted rotating speed to the arm member through the joint member 11.

Further, the arm member 22 internally includes, for example, a motor 220, pulleys 221 and 223, a belt 222, and a decelerator 224.

The motor 220 generates rotating force to rotate the arm member 21 relative to the arm member 22. The motor 220 is provided sideways inside the arm member 22, generates the rotating force with the axis in the direction horizontal to the installation surface of the robot 1 as a rotating axis, and transmits the generated rotating force to the pulley 221.

The pulley 221 is provided inside the arm member 22, and transmits the rotating force transmitted from the motor 220, to the belt 222.

The belt 222 is provided inside the arm member 22, and transmits the rotating force transmitted from the pulley 221, to the pulley 223.

The pulley 223 is provided inside the arm member 22, and transmits the rotating force transmitted from the belt 222, to the decelerator 224.

The decelerator 224 is provided inside the arm member 22, converts a rotating speed of the rotating force transmitted from the pulley 223 at a predetermined ratio, and transmits the rotating force of the converted rotating speed to the arm member 21 through the joint member 12.

Further, the base member 50 internally includes, for example, a motor 51 and a decelerator 52.

The motor 51 generates rotating force to rotate the arm member 22 relative to the base member 50. The motor 51 is provided vertically inside the base member 50, generates rotating force with an axis in a direction perpendicular to the installation surface of the robot 1 as a rotating axis, and transmits the generated rotating force to the decelerator 52.

The decelerator 52 is provided inside the base member 50, converts a rotating speed of the rotating force transmitted from the motor 51 at a predetermined ratio, and transmits the rotating force of the converted rotating speed to the arm member 22 through the joint member 13.

Effects

As described above, in the present embodiment, the robot 1 includes the link 30, the link 31, and the counter weight 32 that are connected by the joint members 10 to 12, and the counter weight 32 includes the motor 300 that generates the rotating force to rotate the arm member 20 relative to the arm member 21.

With this configuration, the motor 300 that generates the rotating force to rotate the arm member 20 relative to the arm member 21 is provided in the counter weight 32. Accordingly, the robot 1 can reduce the volume of the vicinity of the arm member 20 (arm members 20 and 21 and joint member 11) by the volume of the motor 300.

Further, in the robot 1, the link 30 is provided so as to be substantially parallel to the arm member 20 on the direction R1 side, and the link 31 is provided so as to be substantially parallel to the arm member 21 on the direction R1 side. With this configuration, in the robot 1, the rigidity of the arm members 20 and 21 can be more strongly supported by the links 30 and 31.

In the robot 1, the rotating force generated by the motor 300 is transmitted to the arm member 20 by the first transmission mechanism 410 of the transmission member 400 provided inside the counter weight 32 and the second transmission mechanism 420 of the transmission member 400 provided inside the arm member 21. With this configuration, the motor 300 and the first transmission mechanism 410 are provided inside the counter weight 32, and the second transmission mechanism 420 is provided inside the arm member 21, which makes it possible to suppress physical interference such as collision of the transmission member 400 with another object in a space where the robot 1 is disposed. As a result, the robot 1 can operate in a narrow space.

Further, the robot 1 transmits the rotating force generated by the motor 300 to the arm member 20 by the pulleys and the belts provided in the first transmission mechanism 410 and the second transmission mechanism 420. With this configuration, in the robot 1, the counter weight 32 can assist the motion rotating the joint members 10 and 11, the links 30 and 31, and the flange 40 with a simple configuration without requiring complicated parts. This makes it possible to reduce a manufacturing cost and a running cost of the robot 1.

—Modifications—

Note that the present invention is not limited to the above-described embodiment. In other words, the above-described embodiment appropriately modified in design by those skilled in the art is also included in the scope of the present invention as long as the modified embodiment includes the features of the present invention. The elements included in the above-described embodiment and modifications described below can be combined as long as such combinations are technically possible, and such combinations are also included in the scope of the present invention as long as the combinations include the features of the present invention.

For example, in the above-described embodiment, the case where the flange 40 is connected to the front end of the joint member 10 is described; however, the configuration is not limited thereto. In the robot 1, an optional number of arm members and joint members may be further connected to the front end of the joint member 10, and the flange 40 may be connected to a connection destination thereof. In the above-described embodiment, the link 30 is connected to the joint members 10 and 11; however, the configuration is not limited thereto. The robot 1 may not be provided with the link 30.

With this configuration, the robot 1 can assist the motion rotating the arm members and the joint members by the weight of the counter weight 32 irrespective of the number of arm members and links. This makes it possible to reduce the power consumption of the robot 1.

In the above-described embodiment, the transmission member 400 transmits the rotating force by using the pulleys and the belts; however, the configuration is not limited thereto. The transmission member 400 may transmit the rotating force by using a rack and pinion mechanism, a boll and nut mechanism, gears and chains, a line shaft mechanism, or the like.

With this configuration, the robot 1 can transmit the rotating force of the motor 300 by using members suitable for the robot 1. This makes it possible to reduce costs of parts, the volume of the robot 1, and the like.

What is claimed is:

1. A robot, comprising:
   a first arm member;
   a first joint member connected to one end of the first arm member;
   a second arm member having one end connected to the first joint member, so as to rotate relative to the first arm member through the first joint member;
   a second joint member connected to another end of the second arm member;
   a third arm member having one end connected to the second joint member, so as to rotate relative to the second arm member through the second joint member;
   a third joint member connected to another end of the third arm member;
   a flange connected to the third joint member, and configuring to perform a predetermined work on a workpiece;
   a first link having one end connected to the second joint member, and another end connected to the third joint member;
   a second link having one end connected to the second joint member;
   a counter weight connected to another end of the second link and the first joint member, and including a motor on a side opposite to the first joint member with the other end of the second link in between, the motor rotating the third arm member relative to the second arm member; and
   a transmission member configuring to transmit rotating force generated by the motor to the third arm member through the first joint member, the second arm member, and the second joint member.

2. The robot according to claim 1, wherein
the first link is provided to be substantially parallel to the third arm member on a first direction side in a rotating direction of the third arm member relative to the second arm member, and
the second link is provided substantially parallel to the second arm member on the first direction side.

3. The robot according to claim 1, wherein
the transmission member includes a first transmission mechanism provided inside the counter weight, and a second transmission mechanism provided inside the second arm member,
the first transmission mechanism transmits rotating force of the motor to the second transmission mechanism through the first joint member, and
the second transmission mechanism transmits the rotating force transmitted from the first transmission mechanism to the third arm member through the second joint member.

4. The robot according to claim 2, wherein
the transmission member includes a first transmission mechanism provided inside the counter weight, and a second transmission mechanism provided inside the second arm member,
the first transmission mechanism transmits rotating force of the motor to the second transmission mechanism through the first joint member, and the second transmission mechanism transmits the rotating force transmitted from the first transmission mechanism to the third arm member through the second joint member.

5. The robot according to claim 3, wherein
the first transmission mechanism includes a first pulley configuring to rotate following the rotating force generated by the motor, a first belt configuring to transmit the rotating force of the first pulley, and a second pulley configuring to transmit the rotating force transmitted from the first belt to the second transmission mechanism, and the second transmission mechanism includes a third pulley configuring to rotate following the rotating force transmitted from the second pulley, a second belt configuring to transmit the rotating force of the third pulley, and a fourth pulley configuring to transmit the rotating force transmitted from the second belt to the third arm member.

6. The robot according to claim 4, wherein
the first transmission mechanism includes a first pulley configuring to rotate following the rotating force generated by the motor, a first belt configuring to transmit the rotating force of the first pulley, and a second pulley configuring to transmit the rotating force transmitted from the first belt to the second transmission mechanism, and the second transmission mechanism includes a third pulley configuring to rotate following the rotating force transmitted from the second pulley, a second belt configuring to transmit the rotating force of the third pulley, and a fourth pulley configuring to transmit the rotating force transmitted from the second belt to the third arm member.

* * * * *